(No Model.)
P. BURRELL & S. GRIFFITH.
HARVESTER CUTTER BAR.
No. 539,505. Patented May 21, 1895.
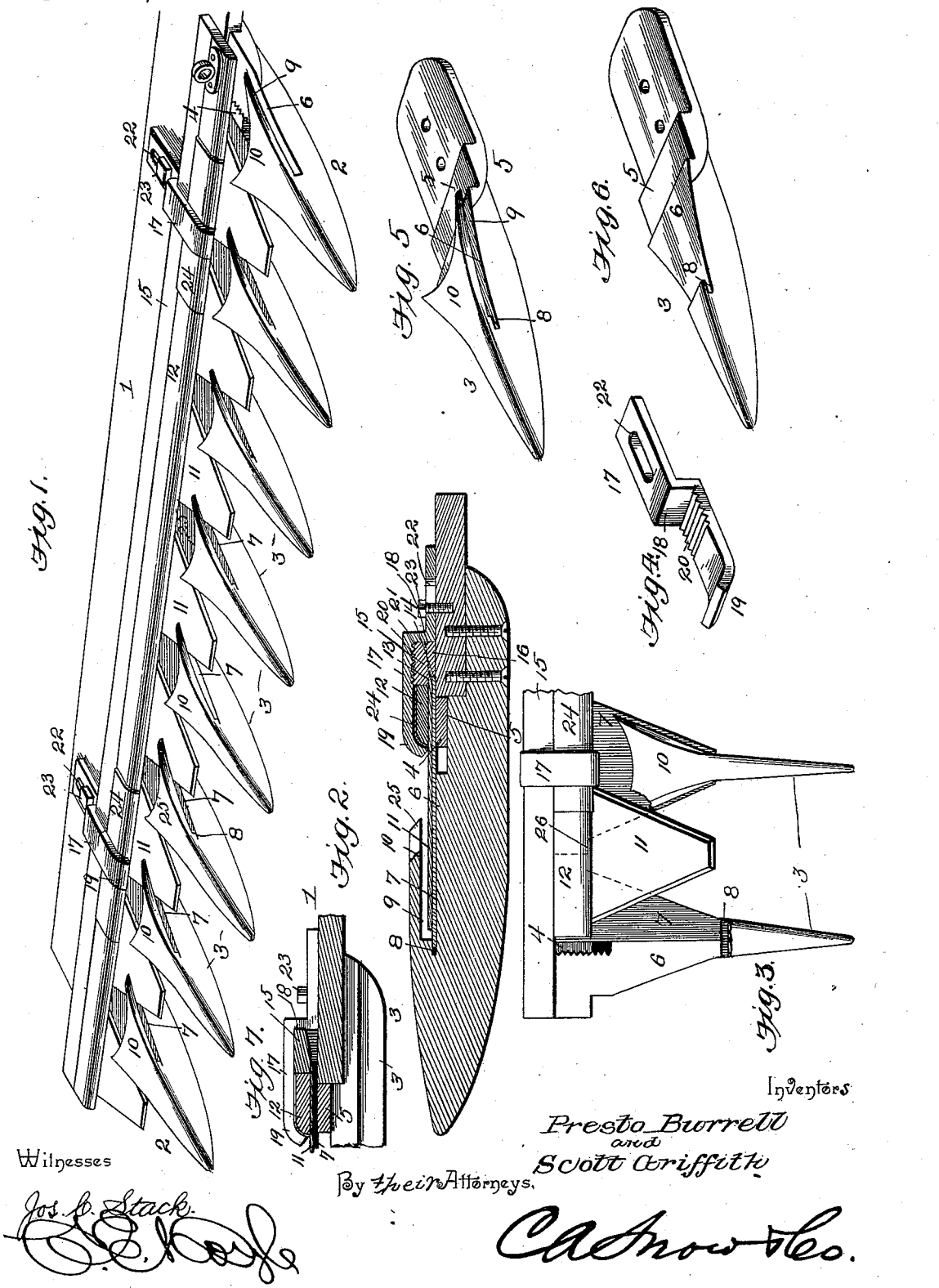
Witnesses
Jos. B. Stack
Inventors
Presto Burrell
and
Scott Griffith
By their Attorneys,
C. A. Snow & Co.

UNITED STATES PATENT OFFICE.

PRESTO BURRELL AND SCOTT GRIFFITH, OF BLACKFOOT, IDAHO.

HARVESTER CUTTER-BAR.

SPECIFICATION forming part of Letters Patent No. 539,505, dated May 21, 1895.

Application filed December 4, 1894. Serial No. 530,805. (No model.)

*To all whom it may concern:*

Be it known that we, PRESTO BURRELL and SCOTT GRIFFITH, citizens of the United States, residing at Blackfoot, in the county of Bingham and State of Idaho, have invented a new and useful Harvester Cutter-Bar, of which the following is a specification.

Our invention relates to cutter bars for moving, reaping, and similar machines, and it has for its object to provide a simple, inexpensive, and efficient construction and arrangement of parts whereby the cutting bar and guide bar are held in place by common means; to provide means whereby the guard plates and cutter bar may be advanced as the cutting edges of said plates and the knives are ground or sharpened; and, furthermore, to provide an improved guard finger whereby the grain or grass is allowed to pass into the rear or reduced portions of the spaces between the guard plates to utilize the entire length of the cutting edges of said guard plates and the cutting knives.

Further objects and advantages of the invention will appear in the following description, and the novel features thereof will be particularly pointed out in the appended claims.

In the drawings, Figure 1 is a perspective view of a cutter-bar embodying our invention. Fig. 2 is a transverse section taken through one of the clamps and a guard-finger. Fig. 3 is a plan view, partly broken away, of one end of the cutter-bar. Fig. 4 is a detail view in perspective of one of the clamps inverted. Fig. 5 is a detail view of one of the guard-fingers. Fig. 6 is a similar view of a modified form of guard-finger. Fig. 7 is a transverse section of the finger-bar, taken midway between two contiguous guard-fingers.

Similar numerals of reference indicate corresponding parts in all the figures of the drawings.

1 designates a finger bar to which are attached the end shoes 2, and the intermediate spaced guard fingers 3, and 4 designates a guard bar which is removably fitted in a seat 5, formed upon the guard fingers adjacent to the front edge of the finger bar. The upper surface of this guard bar is flush with the upper surface of the finger bar and with the upper surface of the body portions 6 of the guard fingers, and the guard plates 7 which are attached to the upper surface of the guard bar extend beyond the rear edge of said bar and rest upon the upper surface of the finger bar. The front ends of the guard plates fit in kerfs 8 formed at the front ends of the horizontal openings 9, between the body portions of the guard fingers and the rearwardly-extending guides 10 which overhang the guard plates. Mounted upon the upper surfaces of the guard plates are the knives 11 which are attached to the sickle bar 12, and said knives are provided with extensions 13 which project beyond the rear edge of the sickle bar in a similar manner to the extensions 14 of the guard plates. Resting upon the finger bar with its front edge in contact with the rear edge of the sickle bar is a holding bar 15 provided with depending offsets or blocks 16, which raise the body portion of said holding bar above and out of contact with the surface of the finger bar. In this space between the under surface of the holding bar and the upper surface of the finger bar are arranged the rearward extensions of the knives and guard plates. Said holding bar is secured in place by means of clamps 17, which are bolted to the finger bar, are provided with shoulders 18 to bear against the rear edge of the holding bar, and are provided with forwardly extending ears 19 turned down at their front ends to engage the front edge of the sickle bar. The under surfaces of the ears of the clamps are curved or serrated, as shown at 20, to engage roughened or serrated surfaces 21 of the holding bar, the serrations of the holding bar being parallel with the length thereof, and those of the clamps lying in a similar direction to intermesh therewith, and the clamps are provided with slots 22 to receive the bolts 23 which secure said clamps to the finger bar, whereby the clamps may be adjusted forwardly for a purpose hereinafter explained. Attached to the upper side of the sickle bar contiguous to each clamp is a wear plate 24 to receive the wear caused by the clamps and prevent injury to the sickle bar.

The guard fingers are provided with rearwardly divergent sides from a point adjacent to the front ends of the guard plates to their point of attachment to the finger bar, such divergence corresponding with that of the guard plates, and the edges of said divergent portions of the guard fingers being approximately parallel with the edges of the guard plates. The overhanging portions or guides of the fingers also have rearwardly divergent side edges which correspond with and lie approximately over the side or cutting edges of the guard plates. These guides extend rearwardly to a point adjacent to the front edge of the sickle bar, and their rear ends are cut away, as shown at 25, approximately in the form of a crescent. These guides allow the grain or grass to pass into the rear portions of the spaces or angles between the cutting edges of the guard plates and thus cause the entire cutting edges of both the guard plates and knives to be utilized in operation.

The guard plates and knives are provided at their rear ends with lateral offsets 26, the ends of which are arranged in contact with the ends of the offsets of contiguous guard plates and knives, and, therefore, in grinding or sharpening the plates or knives the cutting edges of said members may be ground throughout their entire length without affecting these offsets, and hence without affecting the lateral bracing of the plates or knives.

As the cutting edges of the guard plates and knives are ground and the width of said members becomes less, the front ends thereof may be cut or ground off and the guard bar and sickle bar may be advanced or adjusted forwardly. This forward adjustment may be accomplished with facility by loosening the bolts by which the clamps are secured, and moving said clamps and the holding bar forward to retain the same relative positions with the guard and finger bars. This forward adjustment of the cutting members enables them to be used for a greater length of time than an ordinary non-adjustable device, and insures an accurate co-operation of the parts.

In Fig. 6 we have shown a modified form of guard finger in which the overhanging portion or guide is omitted this form of finger being effective in cutting heavy grass.

Various changes in the form, proportion, and the minor details of construction may be resorted to without departing from the spirit or sacrificing any of the advantages of this invention.

Having described our invention, what we claim is—

1. The combination with a finger bar and attached guard fingers, of a guard bar seated contiguous to the front edge of the finger bar, guard plates attached to said guard bar and resting upon the upper surfaces of the body portions of the guard fingers, a sickle bar having its knives mounted upon the surfaces of the guard plates, a holding bar arranged upon the finger bar with its front edge in contact with the rear edge of the sickle bar, clamps secured to the finger bar and provided with shoulders to bear against the rear edge of the holding bar and forwardly extending ears provided with down-turned front ends to engage the front edge of the sickle bar, and means for adjusting the clamps forward with the holding bar, sickle bar, and guard bar to take up wear on the cutting edges of the guard plates and knives, substantially as specified.

2. The combination with a finger bar and guard fingers, of a guard bar seated with its rear edge contiguous to the front edge of the finger bar, guard plates attached to the guard bar and resting upon the body portions of the guard fingers, a sickle bar having knives mounted upon the surfaces of the guard plates, a holding bar arranged upon the finger bar with its front edge in contact with the rear edge of the sickle bar, clamps having shoulders to bear against the rear edge of the holding bar and provided with forwardly-extending ears having down-turned front ends to engage the front edge of the sickle bar, said clamps and holding bar being provided with interlocking surfaces, and bolts arranged in the finger bar and engaging slots in the clamps, substantially as specified.

3. The combination with a finger bar and guard fingers, of a guard bar seated with its rear edge contiguous to the front edge of the finger bar, guard plates attached to the guard bar and resting upon the upper surfaces of the body portions of the guard fingers and provided in rear of the guard bar with extensions which rest upon the upper surface of the finger bar, a sickle bar, knives attached to the sickle bar, resting upon the upper surfaces of the guard plates and provided in rear of the sickle bar with extensions which rest upon the said extensions of the guard plates, a holding bar provided with depending offsets or blocks which rest upon the upper surface of the finger bar, whereby the under surface of the main portion of the holding bar is spaced from the sickle bar, said holding bar being in contact at its front edge with the rear edge of the sickle bar, clamps attached to the finger bar and provided with ears which overhang and engage the holding bar and sickle bar, and means for adjusting the clamps forwardly, substantially as specified.

4. The combination with a finger bar, of fingers attached to the finger bar and having lower body portions and upper overhanging portions or guides, the side edges of said overhanging portions or guides being rearwardly divergent, a guard bar arranged with its rear edge contiguous to the finger bar, guard plates attached to the guard bar, resting upon the upper surfaces of the body portions of the guard fingers and fitted at their front ends in kerfs in the guard fingers, the lateral edges of the guard plates being approximately parallel and flush with the lateral edges of the overhanging portions or guides of the guard fingers, a sickle bar having knives resting upon the upper surface of the guard plates, a holding bar arranged with its front edge in contact with the rear edge of the sickle bar, and forwardly adjustable clamps for holding said parts in operative relation, substantially as specified.

In testimony that we claim the foregoing as our own we have hereto affixed our signatures in the presence of two witnesses.

PRESTO BURRELL.
SCOTT GRIFFITH.

Witnesses:
J. E. MILLER,
H. K. LINGER.